United States Patent [19]

Huebotter

[11] 3,921,256

[45] Nov. 25, 1975

[54] METHOD AND APPARATUS FOR CLEANING CRABS

[76] Inventor: Otto H. Huebotter, 4111 Floyd, Houston, Tex. 77007

[22] Filed: Sept. 13, 1974

[21] Appl. No.: 505,723

[52] U.S. Cl. ................................................. 17/71
[51] Int. Cl.² ........................................ A22C 29/02
[58] Field of Search ........................... 17/71–76, 53, 17/45, 48

[56] References Cited
UNITED STATES PATENTS

| | | | |
|---|---|---|---|
| 3,303,527 | 2/1967 | Lanier | 17/48 |
| 3,388,422 | 6/1968 | Benoit | 17/71 |
| 3,793,676 | 2/1974 | Wiggins | 17/45 |

Primary Examiner—G. E. McNeill
Attorney, Agent, or Firm—Bargfrede and Thompson

[57] ABSTRACT

The crab cleaning method disclosed includes the step of cutting an uncooked crab into two halves along the longitudinal axis of the body of the crab. The crab is cleaned of gills and other unedible parts which are exposed by the cut. The claws or pinchers are removed and each half of the crab is squeezed along a line perpendicular to the longitudinal axis beginning with the legs and squeezing toward the open side of the body to expel the meat out of the shell.

The apparatus disclosed for accomplishing this includes a roller that squeezes the crab half between the roller and the surface of a base member to crush the shell and extrude the edible raw crab meat therefrom.

10 Claims, 5 Drawing Figures

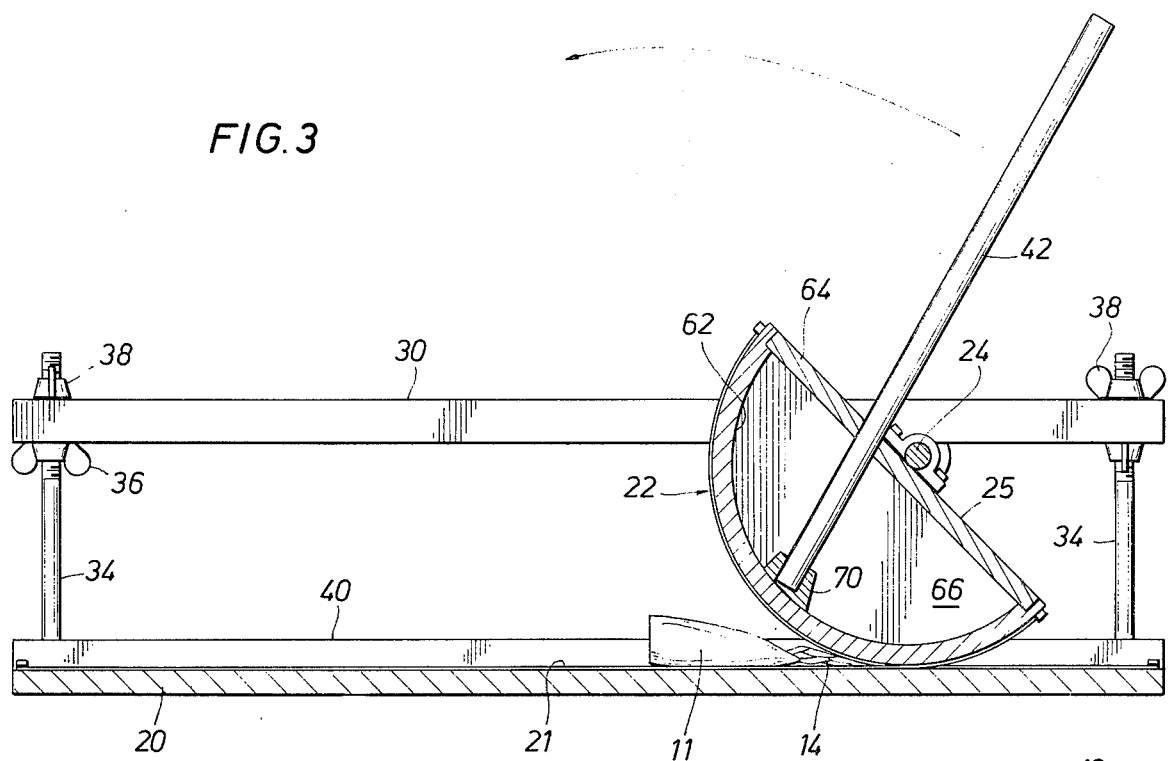
FIG. 3
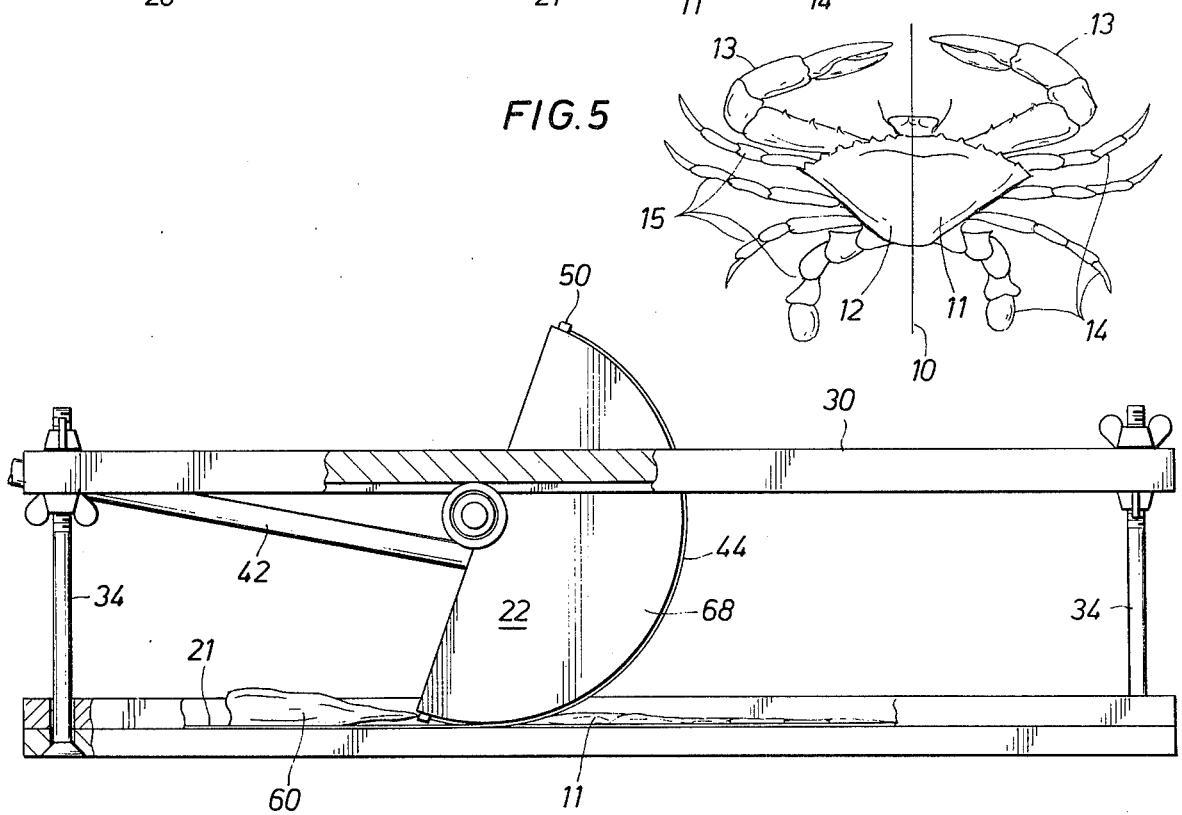
FIG. 5
FIG. 4

METHOD AND APPARATUS FOR CLEANING CRABS

This invention relates generally to a 4ethod 6f and apparatus for cleaning crabs, and in particular to 2uch method and apparatus for cleaning uncooked crabs.

"Cleaning" as used herein means the entire process for removing the edible meat from the shell of the crap beginning with the crab all in one piece. Heretofore, the edible crab meat was always cooked in the shell before it was removed.

It is an object of this invention to provide an improved method of and apparatus for cleaning crabs which includes the step of removing the meat from the crab shell before it is cooked.

It is another object of this invention to provide an improved method of and apparatus for removing the edible meat from the shells of uncooked crabs by squeezing each half of the crab to crush the shell and extrude the raw meat therefrom.

These and other objects, advantages, and features of this invention will be apparent to those skilled in the art from a consideration of this specification, including the attached drawings and appended claims.

In the drawings:

FIG. 3 is a longitudinal sectional view taken along line 3—3 of FIG. 1;

FIG.—4 is a side view partially in section and partially in elevation showing the apparatus in position as it completes the process of extruding the meat from the crab shell; and FIG. 5 is a top view of a typical blue crab, which is the principal source of crab meat in the United States and which is common from Texas to Delaware.

In accordance with the method of this invention, the crab of FIG. 5, while it is still alive or shortly after it has been killed, but before being cooked, is cut approximately along its longitudinal axis indicated by the line 10, which severs its main shell or body into two halves 11 and 12. The gills and other unedible parts of the crab are located adjacent to the line of cut and can be quickly and easily removed from the open side of the shell. Pinchers or claws 13 are then removed from each body half, leaving each half with four attached legs 14 and 15, respectively, toward the open edge of the body half to cause the raw meat in the legs and this portion of the crab shell to be extruded through the open side of the body half. The outer shell, of course, is crushed and flattened as it is squeezed to cause the meat to be so extruded. Preferably, the crab is chilled to about 45° F. before it is cleaned which seems to tranquilize the crab making it easier to handle and which also seems to make the raw crab meat more readily extrudable from the shell.

Figure 1:
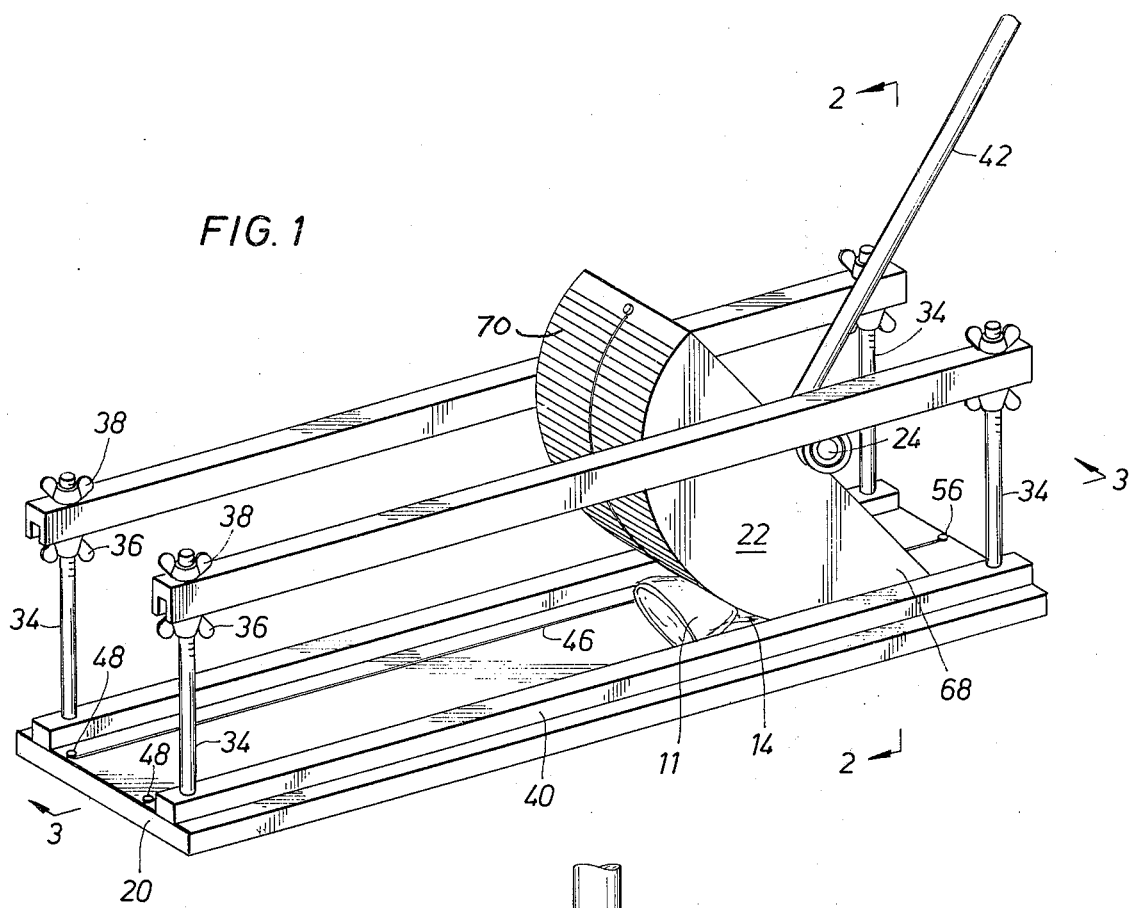
FIG. 1 is an isometric view of the preferred embodiment of the apparatus of this invention, with the apparatus in position to begin to extrude raw meat from one half of a crab.

In FIGS. 1 through 4, hand operated apparatus is shown for squeezing the raw meat from a crab half after the pinchers have been removed, and the gills and other unedible parts cleaned from the shell opening. As shown in FIG. 1, the apparatus includes base member 20 having flat surface 21 to support crab half 11 from which the meat is to be extruded. Roller 22, which in the embodiment shown, comprises one half of a cylinder, is positioned for the arcuate surface of the roller to roll along surface 21. Handle 42 is attached to the roller for so rolling the roller.

Figure 2:
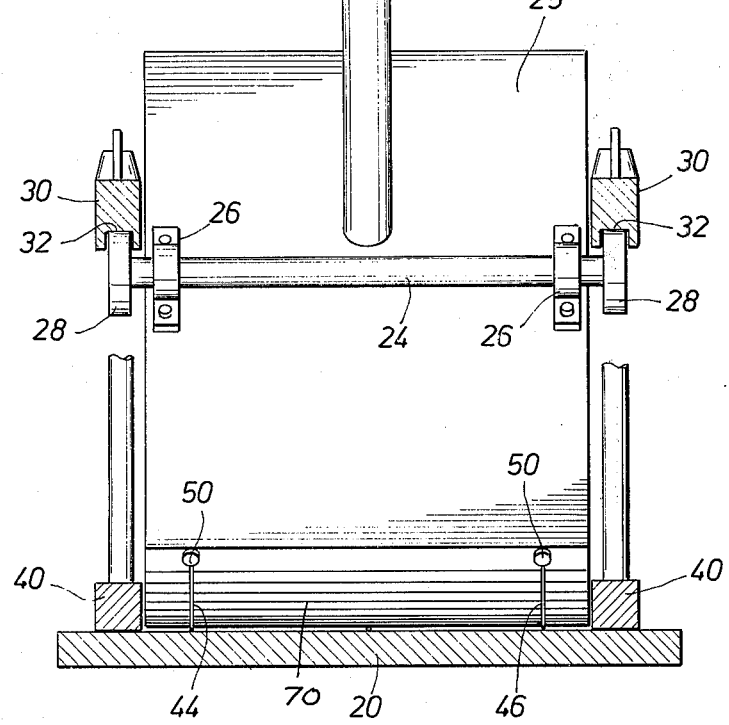
FIG. 2 is a view taken along line 2—2 of FIG. 1.

Means are also provided to hold the roller against upward movement away from surface 21 to cause the roller to squeeze a crab half located between the roller and surface 21 with sufficient pressure to crush and flatten the shell and extrude the raw meat therefrom. In the embodiment shown, such holding means includes shaft 24 which is attached to flat or top side 25 of roller 22 by brackets 26, as shown in FIG. 2. The shaft extends beyond the roller on each side, and has guide rollers or wheels 28 mounted on each end. Located on each side of roller 22 and spaced above surface 21 are rails 30. These rails are parallel to each other and to surface 21 and extend in the direction of travel of roller 22 as it rolls along surface 21. Each guide rail has groove 32 in the bottom surface thereof to receive guide rollers 28 and guide the rollers along the rails.

The distance roller 22 can move upwardly away from surface 21 is dependent upon the position of guide rails 30 relative to surface 21. In the embodiment shown, means are provided to adjust this distance to thereby adjust the force exerted on the crab halves by the roller as it is moved over surface 21. Each guide rail 30 is supported at each end by rods 34. Each rod is attached to base 20 at one end and is threaded at its upper end. Each rod extends through one of rails 30 and is equipped with a pair of wing nuts 36 and 38, which clamp the rail therebetween. Thus, by loosening wing nuts 36 and tightening wing nuts 38 on the top of the rails, the distance between the rails and surface 21 can be reduced. Conversely, by loosening wing nuts 38, wing nuts 36 can be moved upwardly on the rod and move the rails away from surface 21.

Rails 30, which act to hold the roller and cause it to exert a crushing, squeezing force on the crab half, preferably have some resiliency. This will allow the rails to bend as required to accommodate varying upward forces due to the varying thickness of the shell of each crab half. Preferably, the beams and other portions of the apparatus will have sufficient give to accommodate this while maintaining a squeezing force on the crab half that is sufficient to extrude the meat therefrom.

Additional means are provided to hold the roller from lateral movement as it rolls over a crab half. In the embodiment shown, guide strips 40 are located on surface 21 of the base member directly below guide rails 30 and parallel thereto. This positions the members on opposite sides of roller 22 and prevents the roller from moving laterally. Rods 34 extend through the guide strips to hold them in position, as shown in FIG. 4.

Since raw crabs tend to be fairly slick, there could be a tendency for roller 22 to simply slide rearwardly along surface 21 as it is rotated forwardly around shaft 24 by handle 42. To insure that the roller moves forwardly without slippage, means are provided to prevent the roller from slipping relative to surface 21.

In the embodiment shown, flexible lines 44 and 46 have one end connected to base member 20 by pins 48 and the other end connected to roller 22 by pins 50. As roller 22, then, is moved forwardly (to the left, as viewed in FIGS. 1, 3, and 4) by handle 42, it will roll flexible line members 44 and 46 around the arcuate surface thereof and will be forced to move forwardly along surface 21 without slippage. To insure that there is no slippage when the roller is returned to its original position ready for another crab half, flexible line 52 has one end connected to the roller by pin 54 and its other end connected to base member 20 by pin 56. Only one flexible line is used for the return of the roller since there will be less tendency for the roller to slip when moved in that direction.

In operation, to clean a crab, such as shown in FIG. 5, the raw crab is split longitudinally into two halves along line 10. The gills and other unedible parts of the crab are removed by washing and/or handpicking these parts from the open side of the shell left by the cut. Pinchers 13 are then removed from each half of the crab. Then, each half is squeezed progressively from the outer tips of legs 14 and 15, respectively, along a line perpendicular to the line of cut to expel the raw, edible crab meat from the legs and shell of the crab. To accomplish this with the apparatus shown, shell half 11 is placed on surface 21, as shown in FIGS. 1 and 3. Legs 14 extend in the direction of the arcuate surface of roller 22. Handle 42 is pulled in the direction of the arrow (FIG. 3) which, through the action of flexible lines 44 and 46 and the pull on handle 42, causes the roller to roll along surface 21. Wing nuts 36 and 38 have been adjusted to hold rails 30 in position to cause the roller to apply a crushing and squeezing force progressively over legs 14 and then the body half 11 of the crab. As this occurs, the roller moves to the position shown in FIG. 4. The edible crab meat, indicated by the number 60, has been extruded from the crushed shell of crab half 11 onto surface 21, where it can be removed for cooking or further processing. The crushed shell of the crab half is removed from surface 21 and another half, such as half 12, is placed on surface 21 and the operation repeated.

To help improve the holding power of roller 22 to hold the crab half in place as it crushes the shell and extrudes the meat therefrom, the arcuate surface of roller 22 can be provided with transverse serrations 70 to provide a sort of knurled surface to the portion of the roller that engages the crab half.

In FIG. 3 the roller is shown in section to show the structure used in this embodiment. It includes portion 62, which is half of a cylinder and flat plate 64, which closes off the open side of the cylinder. End plates 66 and 68 complete the assembly. Handle 42 extends through plate 64 and has its end anchored to the cylindrical portion 62 by bushing 70. A full roller could be used, if desired.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the method and apparatus of this invention without departing from the scope thereof, it is to be understood that all matter herein set forth or shown in the accompanying drawings is to be interpreted as illustrative and not in a limiting sense.

The invention having been described, what is claimed is:

1. A method of removing the edible meat from the shell of an uncooked crab comprising cutting the crab body into two halves along its longitudinal axis, removing the pinchers, cleaning each half, and squeezing each half of the crab progressively toward the longitudinal axis along which the crab was cut to extrude the raw meat from the shell of the crab.

2. The method of claim 1 further including the step of chilling the crab before squeezing the meat from the body.

3. The method of claim 1 in which the step of squeezing the crab half includes squeezing the legs attached to the crab half progressively in a direction toward the body half and toward the longitudinal axis along which the crab was cut before squeezing the body progressively toward said axis.

4. The method of claim 2 in which the chilling step includes lowering the temperature of the crab to about 45° F.

5. Apparatus for removing the edible meat from the legs and shell of uncooked crabs that have been cut into two halves along the longitudinal axis of the crab, and cleaned, comprising a base member having a generally flat surface to support the crab half, a roller, means mounting the roller for rolling along the surface and for limiting the movement of the roller away from said surface to cause the roller to squeeze the meat from half a crab as it rolls over the half toward the longitudinal axis along which the crab was cut, said roller mounting means including a shaft extending through the axis of rotation of the roller as it rolls along the surface, two spaced rails, means mounting the rails parallel to each other and to the surface on opposite sides of the roller, and guide wheels mounted on the shaft to roll along the underside of the rails as the roller moves over the surface to allow the rails to hold the roller from moving upwardly away from the surface as it squeezes the edible meat from a crab half.

6. The apparatus of claim 5 in which the rail mounting means includes means to adjust the distance the roller can move upwardly away from the surface to vary the pressure placed on a crab half.

7. The apparatus of claim 5 further provided with a pair of parallel guide rails mounted on the surface of the base member on opposite sides of the roller to hold the roller from lateral movement as it rolls along the surface.

8. Apparatus for removing the edible meat from the legs and shell of uncooked crabs that have been cut into two halves along the longitudinal axis of the crab, and cleaned, comprising a base member having a generally flat surface to support the crab half, a roller, means mounting the roller for rolling along the surface for limiting the movement of the roller away from said surface to cause the roller to squeeze the meat from half a crab as it rolls over the half toward the side of the crab half along which the crab was cut, and means to prevent the roller from slipping relative to the surface of the base member as it rolls therealong.

9. The apparatus of claim 8 in which the slippage preventing means includes first flexible line means having one end attached to the surface ahead of the direction of movement of the roller when squeezing a crab half and the other end attached to the roller to hold the roller from slipping as it moves over a crab shell.

10. The apparatus of claim 9 further provided with second flexible line means having one end attached to the base member behind the roller and the other end attached to the roller to keep the roller from slipping on the surface when rolled off of the squeezed crab half.

* * * * *